United States Patent [19]

Harvey

[11] Patent Number: 5,467,607
[45] Date of Patent: Nov. 21, 1995

[54] AIR CONDITIONING CONTROL SYSTEM

[75] Inventor: William J. Harvey, Hoboken, N.J.

[73] Assignee: AT&T Corp., Murray Hill, N.J.

[21] Appl. No.: 199,045

[22] Filed: Feb. 22, 1994

[51] Int. Cl.$^6$ ........................................ F28F 7/00
[52] U.S. Cl. ............ 62/186; 62/259.2; 165/80.3; 236/78 D; 361/691
[58] Field of Search ............ 236/78 D; 62/259.2, 62/186; 165/80.2, 80.3, 80.4

[56] References Cited

U.S. PATENT DOCUMENTS

| | | | |
|---|---|---|---|
| 2,979,596 | 4/1961 | Karp | 236/78 D |
| 4,736,594 | 4/1988 | Pao | 62/155 |
| 4,744,408 | 5/1988 | Cordino, Jr. et al. | 162/2 |
| 5,021,763 | 6/1991 | Obear | 340/407 |
| 5,102,040 | 4/1992 | Harvey | 236/49.3 |

FOREIGN PATENT DOCUMENTS

| | | | |
|---|---|---|---|
| 0190645 | 11/1983 | Japan | 236/78 D |
| 0006530 | 1/1986 | Japan | 236/78 D |

Primary Examiner—William E. Wayner
Attorney, Agent, or Firm—Barry H. Freedman; Gregory C. Ranieri

[57] ABSTRACT

An air conditioning control system monitors the temperature in the vicinity of electronic equipment using one or more sensors placed either in the equipment area or at the outlet of an air conditioning duct or vent. The temperature sensors supply signals to a microprocessor that is programmed to adjust the output of a system controller such that the amount of cooling provided by the air conditioning system is controlled. Illustratively, when the air conditioning system is restarted after a power failure, the power applied to one or more air conditioning fan motors is controlled, such as by throttling the motors down to an acceptable speed, to in turn control the cooling effect on the equipment. The amount of cool air produced by the air conditioning system is detected by the sensors, thereby forming a feedback control loop. Using this arrangement, electronic equipment failures which occur because of thermal shock due to air conditioning start ups after cooling system outages are reduced, by lowering the rate of temperature change to which electronic equipment is exposed.

8 Claims, 2 Drawing Sheets

5,467,607

AIR CONDITIONING CONTROL SYSTEM

FIELD OF THE INVENTION

This invention relates generally to a system for controlling air conditioning, and, in particular, to such a system which is arranged to control the rate of change of temperature produced by an air conditioning system to avoid thermal shock to electrical components that are being cooled. This is particularly useful after an incident, such as a power failure, which causes the temperature of the electrical components to rise.

BACKGROUND OF THE INVENTION

A good deal of computer and electronic equipment, such as free convection cooled electronic telephone switching equipment, becomes temperature sensitive with age. In the case of central office telephone equipment, this problem has resulted in several significant telephone network outages which have been attributed to thermal shock, i.e., when the rate of temperature change in the central office is too great. One specific situation in which this occurs is when, after an outage, the air conditioning system comes back on line, such as when power is restored to the cooling system after a power failure.

In many existing telephone central office building system designs, cooling systems are designed for high velocity air movement that is directed towards equipment cabinets or bays. This type of design is intended to allow air to be moved around extensive overhead air blockages, such as cable distribution systems normally found in central offices. Cooled air is directed against equipment with the highest heat dissipation. If the air conditioning fails, the temperature of the equipment rises gradually with ambient temperature in the central office. When the air conditioning is thereafter restored, cool air is directed toward the electronic equipment, causing a very fast change in temperature. This type of thermal stressing or thermal shock causes failures in the electronics to occur.

To avoid the problems just described, certain maintenance procedures have been attempted to keep room temperature variation to a prescribed level, and to keep temperature changes within a desired tolerance, such as 10 degrees/hr. Procedures that require manually shutting off dampers, starting one of multiple cooling fans at a time, or manually switching the cooling system on and off have been recommended and attempted. In all cases, these procedures have failed because of the inability of a human to monitor and accurately control the system. Because of this human element and the varied and complex nature of these building systems, manually controlling temperature variation has proven hard to implement. It has not solved the problem of directed cool air causing fast increases in heat transfer rates of electronic devices.

Another current approach involves the use of heating, ventilation and air conditioning (HVAC) systems designed with low velocity horizontal air movement. The purpose of such systems is to allow rapid temperature changes to be minimized. This system, which is used, for example, on new raised floor installations, gives a certain thermal inertia to the office, by not blowing air directly on equipment. However, this approach is neither cost effective nor risk averse for existing installations, because replacement of existing high velocity air delivery systems is very expensive and can adversely affect electronics.

SUMMARY OF THE INVENTION

In accordance with the present invention, an air conditioning control system monitors the temperature in the vicinity of electronic equipment, using one or more sensors, such as thermistors, placed either in the equipment area or at the outlet of an air conditioning duct or vent. The temperature sensors supply signals to a microprocessor that is programmed to adjust the output of a system controller such that the amount of cooling provided by the air conditioning system is controlled. Illustratively, when one or more air conditioning fan motors are started after a power failure, the controller throttles the motors down to an acceptable speed, to in turn control the cooling effect on the equipment. The amount of cool air produced by the air conditioning system is detected by the sensors, thereby forming a feedback control loop. Using this arrangement, electronic equipment failures which occur because of thermal shock due to air conditioning start ups after cooling system outages are reduced, by controlling the rate of temperature change R to which electronic equipment is exposed, so that R does not exceed a predetermined maximum value consistent with eliminating thermal shock to the electronic equipment.

BRIEF DESCRIPTION OF THE DRAWING

The present invention will be more fully appreciated by consideration of the following detailed description, which should be read in light of the accompanying drawing in which.

DETAILED DESCRIPTION

Figure 1:
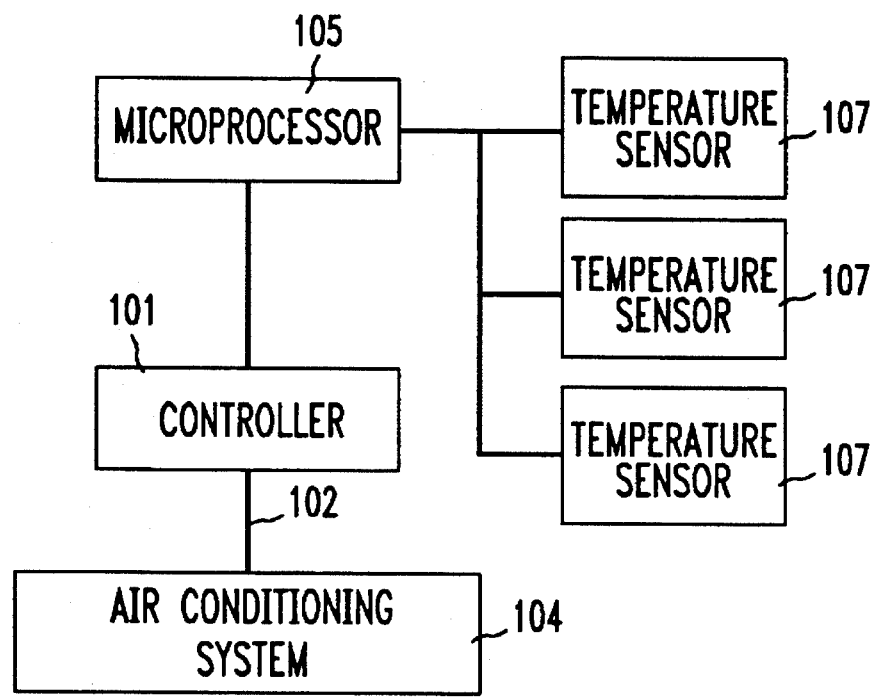
FIG. 1 is a block diagram illustrating an air conditioning control system arranged in accordance with the present invention.

Referring first to FIG. 1, there is shown a block diagram illustrating an air-conditioning control system arranged in accordance with the present invention. In the block diagram shown in FIG. 1, a controller 101 provides a control signal on line 102 to control the output of an air conditioning system 104.

Figure 3:
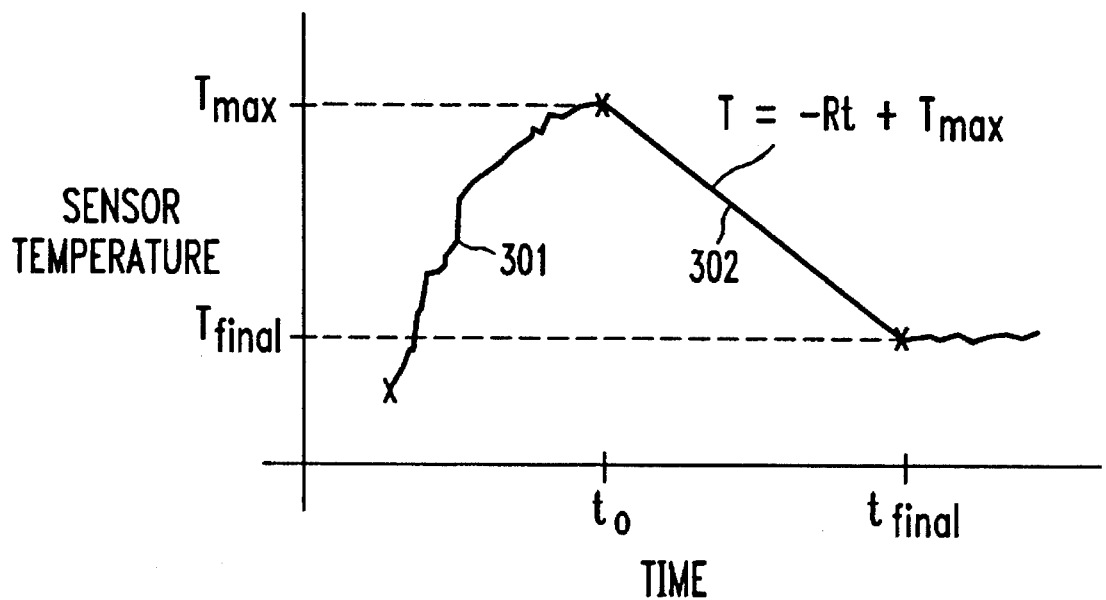
FIG. 3 shows the relationship between sensor temperature and the time domain, when the present invention is implemented.

A microprocessor 105, typically under the control of a stored program, serves the purpose of receiving inputs from and thus monitoring multiple temperature sensors 107 which are advantageously located throughout the physical area of the electronic equipment being cooled. As explained more fully below, microprocessor 105 desirably monitors the temperature change as a function of time (i.e., the rate of temperature change), and sends a signal to controller 101 that is appropriate to control the output of air conditioning system 104 to limit the maximum rate of temperature change in accordance with a predetermined value. (An exemplary temperature control curve is shown in FIG. 3, described below.) Thus, a feedback control loop is established by the arrangement of FIG. 1: air conditioning system 104 produces cooling that is sensed by temperature sensors 107; a control signal is generated in microprocessor 105 to change the output of controller 101 to increase or decrease the amount of cooling generated by air conditioning system 104, as needed to avoid thermal shock. The temperature change is sensed, and the control cycle is thus repeated, so that the maximum rate of temperature change is never exceeded. If desired, controller 101 can be arranged to be activated only after restoration of power following a power outage. At other times, the controller functions "transparently", so that temperature control is achieved using conventional thermostats.

Figure 2:
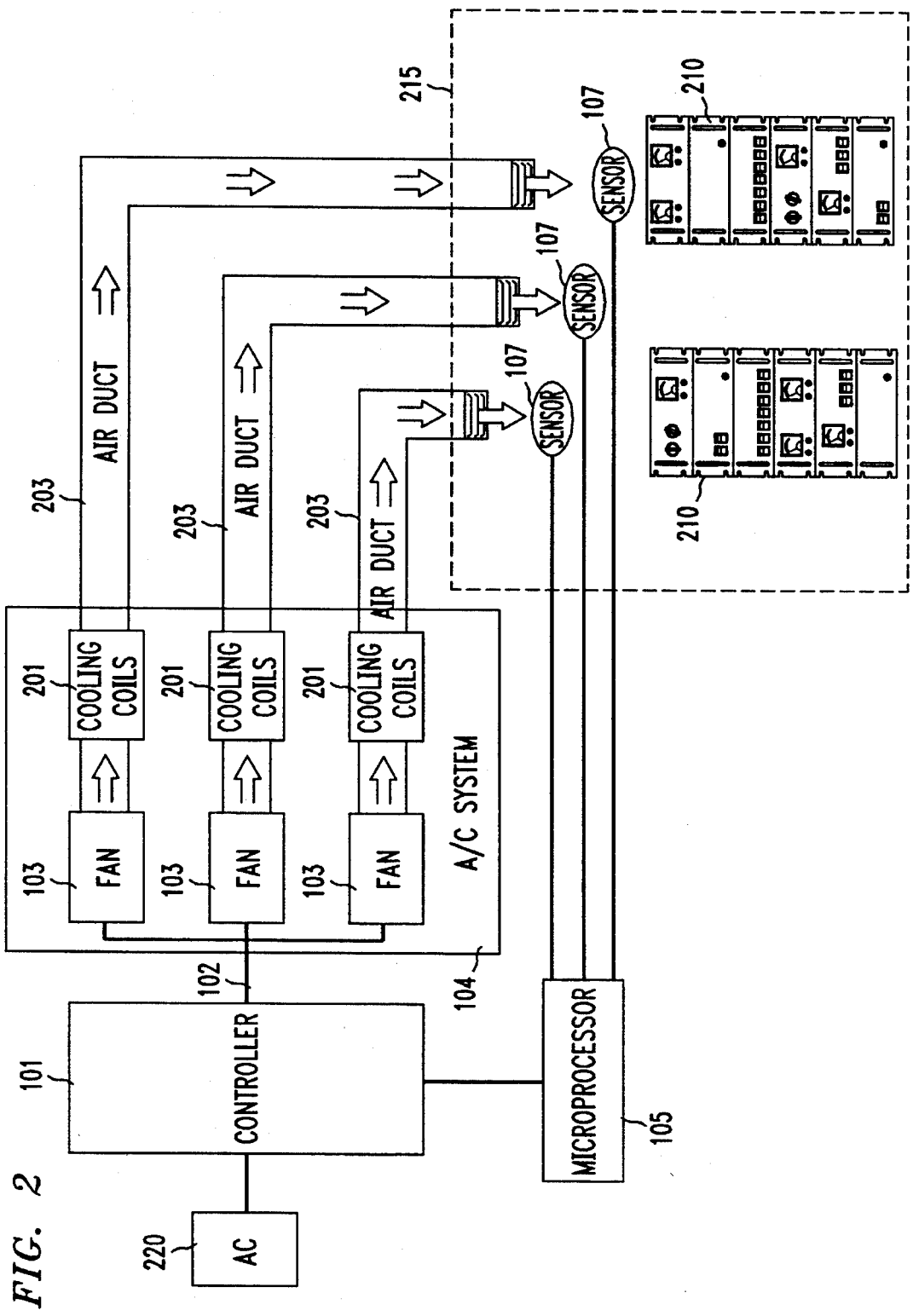
FIG. 2 is a diagram illustrating electronic equipment such as found in a telephone company central office, which is cooled by an air-conditioning system controlled in accordance with the present invention.

FIG. 2 is a diagram illustrating an area 2 15 (such as a telephone company central office) that includes electronic equipment 210. In FIG. 2, temperature sensors 107 are shown placed in the airstream output from air conditioning ducts 203, which direct cooled air in the vicinity of the electronic equipment 210. Temperature sensors 107 provide signals indicative of the temperature near electronic equipment 210 to microprocessor 105, which is arranged to transmit a signal to controller 101 that adjusts the amount of power from a power source 220 that is applied to air conditioning system 104. The control signal is adapted so that a desired rate of temperature change is achieved in the vicinity of electronic equipment 210. This is explained in conjunction with FIG. 3.

Control of the output of air conditioning system 104 is illustratively achieved by controlling the speed of a series of fan motors 103 in air conditioning system 104, which direct air through cooling coils 201 and ducts 203 towards the electronic equipment 210 being cooled. Fan motor speed control can be effected in various ways available to those skilled in the art, such as by varying the duty cycle of a pulsed signal which is applied to fan motors 103 from power source 220. Such an arrangement results in a current adjustment being supplied to fan motors 103, in turn controlling motor speed and thus the amount of cooling provided by air conditioning system 104.

FIG. 3 shows the desired relationship between the temperature in the vicinity of electronic equipment 210, as a function of time. In FIG. 3, T=sensor temperature near electronic equipment 210; R=maximum rate of temperature change allowable for most sensitive electronics; t=time; and $T_{max}$=peak temperature in area 215. The temperature curve in FIG. 3 has two distinct portions, portions 301 and 302. The first portion 301 occurs when a power failure situation exists, and the temperature rises to a maximum $T_{max}$ at time $t=t_o$. At this time, the air conditioning system 104 is restored to operation. The present invention then controls the rate of temperature change (R), so that the temperature reaches $T_{final}$ at time $t_{final}$. This avoids thermal shock. Control is achieved in microprocessor 105, which adjusts the signal applied to controller 101 so as to render the temperature vs. time relation as close as possible to the desired relationship represented by the second portion 302 of FIG. 3.

Various modifications and adaptations may be made to the present invention by those skilled in the art. For this reason, it is intended that the invention be limited only by the appended claims.

I claim:

1. A control system for reducing the effects of thermal shock on electrical components located in an area cooled by an air conditioning system, said control system comprising a sensor for monitoring rate of temperature change R in said area in which said electrical components are located;

means for controlling the output of said air conditioning system;

means for coupling an output from said sensor to said controlling means to control said rate of temperature change R experienced by said electrical components, so that R does not exceed a predetermined maximum value consistent with eliminating thermal shock to said electrical components, and means for activating said controlling means only after restoration of power to said air conditioning system following a power outage.

2. A temperature control system, comprising cooling means for providing cooling in the vicinity of electronic equipment, means for sensing the temperature in said vicinity of said electronic equipment, means responsive to the output of said sensing means for controlling the cooling output from said cooling means so that the rate of temperature change is said vicinity of said electronic equipment is limited to a predetermined maximum value R, and means for activating said controlling means only when the operation of said cooling means is resumed after a period of inactivity.

3. The invention defined in claim 2 wherein said maximum value R is selected to avoid thermal shock to said electronic equipment.

4. The invention defined in claim 2 wherein said sensing means is a thermistor.

5. Apparatus for controlling the maximum rate of temperature change to which electronic components located in an area cooled by an air conditioning system are subjected, so that said thermal shock to said components is reduced when operation of said air conditioning system is resumed after an outage, said apparatus comprising means for monitoring the temperature in said cooled area;

processor means responsive to the output of said monitoring means arranged to determine the amount of cooling from said air conditioning system necessary to limit the maximum rate of change of temperature experienced by said electrical components;

control means for controlling the output of said air conditioning system only when operation of said air conditioning system is resumed after an outage; and means for coupling the output from said processor means to said control means.

6. The invention defined in claim 5 wherein said control means is arranged to control the amount of power applied to said air conditioning system from a power source.

7. The invention defined in claim 6 wherein said control means is arranged to control the duty cycle of power applied to said air conditioning system from said power source.

8. The invention defined in claim 5 wherein said processor means is a program controlled microprocessor.

\* \* \* \* \*